United States Patent
Shibasaki et al.

(10) Patent No.: US 11,551,062 B2
(45) Date of Patent: Jan. 10, 2023

(54) OPTIMIZATION APPARATUS AND CONTROL METHOD THEREOF

(71) Applicant: FUJITSU LIMITED, Kawasaki (JP)

(72) Inventors: Takayuki Shibasaki, Kawasaki (JP); Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 448 days.

(21) Appl. No.: 16/240,832

(22) Filed: Jan. 7, 2019

(65) Prior Publication Data
US 2019/0220732 A1   Jul. 18, 2019

(30) Foreign Application Priority Data

Jan. 17, 2018  (JP) .............................. JP2018-005256

(51) Int. Cl.
*G06N 3/04* (2006.01)
*G06N 3/08* (2006.01)
*G06N 7/00* (2006.01)

(52) U.S. Cl.
CPC ......... *G06N 3/0472* (2013.01); *G06N 3/0445* (2013.01); *G06N 3/086* (2013.01); *G06N 7/005* (2013.01)

(58) Field of Classification Search
CPC .... G06N 3/0472; G06N 3/0445; G06N 3/086; G06N 7/005
See application file for complete search history.

(56) References Cited

U.S. PATENT DOCUMENTS

| | | | | |
|---|---|---|---|---|
| 7,840,504 B2* | 11/2010 | Sun | ........................ | G06N 5/02 706/62 |
| 8,296,120 B2* | 10/2012 | Phillips | .................. | G06F 30/34 703/2 |
| 2016/0260013 A1* | 9/2016 | Rønnow | ................ | G06N 7/005 |
| 2017/0220924 A1 | 8/2017 | Danjo et al. | | |
| 2019/0130295 A1* | 5/2019 | Okuyama | .............. | G06F 17/11 |

FOREIGN PATENT DOCUMENTS

| | | |
|---|---|---|
| JP | 2017-138760 | 8/2017 |
| JP | 2017-209112 | * 11/2017 |

* cited by examiner

*Primary Examiner* — Michael J Huntley
*Assistant Examiner* — Adam C Standke
(74) *Attorney, Agent, or Firm* — Fujitsu Patent Center

(57) ABSTRACT

A transition control unit detects, when stochastically determining based on a temperature, energy changes, and a random number whether to accept any of a plurality of state transitions according to a relative relationship between the energy changes and thermal excitation energy, a minimum value among the energy changes. The transition control unit then subtracts, when the minimum value is positive, an offset obtained by multiplying the minimum value by a value M that is greater than 0 and less than or equal to 1 from each of the energy changes corresponding to the plurality of state transitions.

6 Claims, 18 Drawing Sheets

| OUTPUT FROM SELECTION CIRCUIT 60b | fg1 | fg2 | fg3 | OUTPUT FROM SELECTION CIRCUIT 72 | id3 |
|---|---|---|---|---|---|
| 1 | 1 | 1 | 1 | 1 | 1, id1 |
| 1 | 1 | 0 | 1 | 1 | 1, id1 |
| 1 | 0 | 1 | 1 | 0 | 0, id2 |
| 1 | 0 | 0 | 0 | 1 | 1, id1 |
| 0 | 1 | 1 | 1 | 0 | 0, id2 |
| 0 | 1 | 0 | 1 | 1 | 1, id1 |
| 0 | 0 | 1 | 1 | 0 | 0, id2 |
| 0 | 0 | 0 | 0 | 0 | 0, id2 |

FIG. 10

OPTIMIZATION APPARATUS AND CONTROL METHOD THEREOF

CROSS-REFERENCE TO RELATED APPLICATION

This application is based upon and claims the benefit of priority of the prior Japanese Patent Application No. 2018-005256, filed on Jan. 17, 2018, the entire contents of which are incorporated herein by reference.

FIELD

The embodiments discussed herein relate to an optimization apparatus and a control method thereof.

BACKGROUND

In today's society, information processing is performed in various fields by using arithmetic devices such as computers. Meaningful results are obtained by calculating and processing various data, and the obtained results are used for prediction, determination, and control operations, for example. Optimization processing is one of the important techniques in the field of information processing. For example, the optimization processing is applicable to a problem in which a solver needs to minimize the resources or cost needed when certain processing is performed. The optimization processing is also applicable to a problem in which the solver needs to maximize the effect obtained by the certain processing. Apparently, solving these problems is very important.

As a typical optimization problem, there is a linear programming in which an evaluation function represented by a linear sum of a plurality of continuous variables is used. In this linear programming, values are obtained for the variables such that the evaluation function is maximized or minimized under constraints represented by the linear sum. The linear programming is used in various fields such as product production scheduling. For this linear programming, excellent algorithms such as a simplex method and an interior point method are known, and even a problem having hundreds of thousands of variables or more is efficiently solvable.

There are also many optimization problems in which discrete values are used for variables instead of continuous values. One example is a traveling salesman problem in which a solver determines the shortest possible route that a salesman takes when the salesman visits a plurality of cities sequentially and returns to the origin city. Another example is a knapsack problem in which a solver is given a set of different items and selects a set of items with which the solver fills a knapsak such that the total value of the selected items is as large as possible. This kind of problem is referred to as a discrete optimization problem, a combinatorial optimization problem, etc., and it is known that calculation of an optimal solution for this kind of problem is very difficult.

The biggest reason for this difficulty is that only discrete values are used for individual variables. Namely, an optimal solution is not obtainable by continuously changing variables in a direction in which an evaluation function is improved. In addition, there are extraordinary numbers of values that result in local extrema of the evaluation function (local minimums (maximums) or local solutions), other than the values of the variables that result in an accurate optimal value (an optimal solution or a global solution). Thus, since a method such as a brute-force method needs to be used to obtain an optimal solution certainly, the calculation time is significantly extended. Among the discrete optimization problems, there are many problems referred to as NP (Non-deterministic Polynomial)-hard problems in complexity theory. In these NP-hard problems, the calculation time for obtaining an optimal solution is expected to extend exponentially with respect to the size of the problem (namely, the number of variables). The above traveling salesman problem and knapsack problem are also NP-hard problems.

As described above, it is very difficult to certainly obtain optimal solutions to discrete optimization problems. Thus, for practically important discrete optimization problems, algorithms that use characteristics unique to the respective problems are created. As described above, in many discrete optimization problems, to obtain an exact solution, the calculation time is expected to extend exponentially with respect to the size of the problem. Thus, many of the practical solution methods are approximate solution methods in which a value of an evaluation function does not indicate an optimal value but a value close to the optimal value as a solution.

In contrast to these approximation algorithms specially designed for the target problems, there are also known other approximation algorithms in which a wide range of problems are solved without using characteristics unique to the problems. These approximation algorithms are referred to as metaheuristics, and their examples include simulated annealing (SA), a genetic algorithm, and a neural network. While these algorithms could have lower efficiency than the algorithms that suitably use characteristics unique to the problems, these algorithms are expected to obtain solutions more quickly than the algorithms designed to obtain exact solutions.

Hereinafter, simulated annealing will be described.

Simulated annealing is a kind of a Monte Carlo method and is a method in which a solution is stochastically calculated by using a random number. The following description will be made by using, as an example, a problem in which a value of an evaluation function to be optimized is minimized, and the value of the evaluation function will be referred to as energy. If the problem was to maximize the value, the sign of the evaluation function would be changed.

Simulated annealing starts with an initial state in which a discrete value has been assigned to an individual variable. Next, from the current state (a combination of values of variables), a state close to the current state (for example, a state in which only one of the variables has been changed) is selected, and this state transition is examined. By calculating change of the energy associated with the state transition, whether to adopt the state transition and change the current state or maintain the original state without adopting the state transition is stochastically determined based on the calculated value. By setting the adoption probability of a state transition that results in a drop in the energy to be greater than the adoption probability of a state transition that results in a rise in the energy, state changes occur in a direction in which the energy drops on average. Thus, it is expected that the state will be transitioned to a more suitable state over time. Consequently, an optimal solution or an approximate solution that results in energy close to the optimal solution could be obtained finally. If whether to adopt the state transition is determined in a deterministic way, for example, if state transitions that result in a drop in the energy are adopted and those that result in a rise in the energy are not adopted, the change of the energy weakly decreases over time. However, once a local solution is reached, no further changes will occur. As described above, in a discrete optimization problem, since there are extraordinary numbers of local solutions, in many cases the state is stuck at a local solution that is not very close to an optimal value. Thus, it is important to determine whether to adopt the state transition stochastically.

In simulated annealing, it has been proved that a state reaches an optimal solution with an infinite time (an infinite number of iterations) if the adoption (acceptance) probability of the transition of the state is determined as follows.

(1) When an energy change associated with a state transition is denoted by ($\Delta E$), an acceptance probability p of the state transition is determined by any one of the following functions f(x).

$$p(\Delta E, T) = f(-\Delta E/T) \quad (1\text{-}1)$$

$$f_{metro}(x) = \min(1, e^x) \text{ (METROPOLIS METHOD)} \quad (1\text{-}2)$$

$$f_{Gibbs}(x) = \frac{1}{1+e^{-x}} \text{ (GIBBS METHOD)} \quad (1\text{-}3)$$

In mathematical formula 1-1, T represents a parameter referred to as a temperature and is changed as follows.

(2) As expressed by the following mathematical formula, the temperature T is dropped logarithmically with respect to the number t of iterations.

$$T = \frac{T_0 \log(c)}{\log(t+c)} \quad (2)$$

In the above mathematical formula, $T_0$ represents an initial temperature, and it is desirable that a sufficiently large value be set as $T_0$ on the basis of the problem.

When the acceptance probability expressed by the mathematical formulas in the above (1) is used and when a steady state is reached after a sufficient number of iterations, the occupation probability of an individual state is in accordance with a Boltzmann distribution at thermal equilibrium in thermodynamics. Since the occupation probability of a lower energy state rises by gradually decreasing a sufficiently high initial temperature, when the temperature has sufficiently dropped, a low energy state is supposed to be obtained. Since this behavior resembles state change seen when material is annealed, this method is called simulated annealing. In simulated annealing, the stochastic occurrence of a state transition that results in a rise in the energy corresponds to thermal excitation in physics.

As described above, in simulated annealing, an optimal solution is reached by setting an infinite number of iterations. However, in reality, since a solution needs to be obtained with a finite number of iterations, an optimal solution is not obtained certainly. In addition, since the temperature drops very gradually in accordance with the above formula, the temperature does not drop sufficiently within a finite time. Thus, in many cases of actual simulated annealing, the temperature is dropped more quickly, instead of using the logarithmic temperature change.

FIG. 15 illustrates a conceptual configuration of an optimization apparatus that performs simulated annealing. While cases in which a plurality of state transition candidates are generated will be also described in the following description, the transition candidates are generated one by one in conventional and basic simulated annealing.

An optimization apparatus 10 includes a state storage unit 11 that holds the current state S (values of a plurality of state variables). The optimization apparatus 10 also includes an energy calculation unit 12 that calculates, when at least one state transition from the current state S occurs as a result of change of at least one of the values of the plurality of state variables, the energy changes $\{\Delta E_i\}$ of the respective state transitions. In addition, the optimization apparatus 10 includes a temperature control unit 13 that controls a temperature T and a transition control unit 14 that controls state changes.

The transition control unit 14 refers to the temperature T, the energy changes $\{\Delta E_i\}$, and a random number to stochastically determines whether to accept any of a plurality of state transitions according to a relative relationship between the energy changes $\{\Delta E_i\}$ and the thermal excitation energy.

The transition control unit 14 will be described in more detail. The transition control unit 14 includes a candidate generation unit 14a that generates state transition candidates and a transition acceptance determination unit 14b that stochastically determines whether to accept each state transition candidate from the corresponding energy changes $\{\Delta E_i\}$ and the temperature T. In addition, the transition control unit 14 includes a transition determination unit 14c that determines a candidate to be adopted from the accepted candidates and a random number generation unit 14d that generates a probability variable.

Next, an operation in a single iteration will be described. First, the candidate generation unit 14a generates at least one state transition candidate (candidate number $\{N_i\}$) from the current state S stored in the state storage unit 11 to the next state. The energy calculation unit 12 calculates the energy changes $\{\Delta E_i\}$ for the respective state transition candidates by using the current state S and the respective state transition candidates. By using the temperature T generated by the temperature control unit 13 and a probability variable (a random number) generated by the random number generation unit 14d, the transition acceptance determination unit 14b determines whether to accept each of the state transitions with the acceptance probability expressed by the above formulas 1-1 to 1-3 based on the energy changes $\{\Delta E_i\}$ of the respective state transitions. In addition, the transition acceptance determination unit 14b outputs transition determination results $\{f_i\}$ indicating whether to accept the respective state transitions (the results will hereinafter be referred to as state transition acceptance determination results, as needed). When the transition acceptance determination unit 14b has accepted a plurality of state transitions, the transition determination unit 14c randomly selects one of the state transitions by using a random number. Next, the transition determination unit 14c outputs the transition number N of the selected state transition and the corresponding transition determination result f. When there is an accepted state transition, the values of the state variables stored in the state storage unit 11 are updated based on the adopted state transition.

Starting with the initial state, the optimization apparatus 10 repeats the above iteration while causing the temperature control unit 13 to drop the temperature. When a certain number of iterations is reached, the optimization apparatus 10 ends the operation. Alternatively, when a termination determination condition is satisfied, for example, when the energy falls below a certain value, the optimization apparatus 10 ends the operation. The solution outputted by the optimization apparatus 10 is the state corresponding to the end of the operation. However, in reality, since the temperature does not reach 0 with a finite number of iterations, an individual state occupancy rate has a distribution represented by a Boltzmann distribution or the like even at the end of the operation. Namely, there is no guarantee that an optimal solution or a good solution is obtained. Thus, in a realistic solution method, the lowest energy state obtained with a finite number of iterations is stored and outputted finally.

FIG. 16 is a circuit-level block diagram illustrating a configuration example of the transition control unit used in conventional simulated annealing in which candidates are generated one by one, the configuration example focusing on an arithmetic portion needed for the transition acceptance determination unit.

The transition control unit 14 includes a random number generation circuit 14$b$1, a selector 14$b$2, a noise table 14$b$3, a multiplier 14$b$4, and a comparator 14$b$5.

Of all the energy changes $\{\Delta E_i\}$ calculated for the respective state transition candidates, the selector 14$b$2 selects and outputs one energy change corresponding to the transition number N, which is a random number generated by the random number generation circuit 14$b$1.

Functions of the noise table 14$b$3 will be described below. For example, a memory such as a random access memory (RAM) or a flash memory may be used as the noise table 14$b$3.

The multiplier 14$b$4 outputs a product of a value outputted by the noise table 14$b$3 and the temperature T (the product corresponds to the above thermal excitation energy).

The comparator 14$b$5 compares the product outputted by the multiplier 14$b$4 with the energy change selected by the selector 14$b$2 and outputs the comparison result as a transition determination result f.

Basically, the function described above is implemented without change on the transition control unit 14 illustrated in FIG. 16. However, since the mechanism of accepting a state transition with the acceptance probability expressed by the formulas in the above (1) has not been described yet, the following description will be made on the mechanism.

A circuit that outputs 1 when the acceptance probability p is established and outputs 0 when (1−p) is established may be realized by a comparator that have two input terminals a and b and that outputs 1 when a>b and outputs 0 when a<b. More specifically, the acceptance probability p is inputted to the input terminal a of the comparator, and a uniform random value, which is a value in a section [0, 1), is inputted to the input terminal b. Thus, by inputting a value indicating the acceptance probability p calculated by using formula (1) based on the energy change and the temperature T to this input terminal a of the comparator, the above function is realized.

Namely, assuming that f is the function used in the formulas in the above (1) and that u is a uniform random number, which is a value in the section [0, 1), the circuit that outputs 1 when f(ΔE/T)>u realizes the above function.

The same function is realized by any of the following variations. The two numbers maintain the same magnitude relationship even when the same monotonically increasing function is applied to the two numbers. Thus, even when the same monotonically increasing function is applied to the two input terminals of the comparator, the same output is obtained. When an inverse function $f^{-1}$ of the function f is adopted as this monotonically increasing function, it is seen that a circuit that outputs 1 when −ΔE/T>$f^{-1}$(u) or a circuit that outputs 1 when ΔE/T≤$f^{-1}$(u) is suitable. In addition, since the temperature T is positive, a circuit that outputs 1 when −ΔE>T$f^{-1}$(u) or a circuit that outputs 1 when ΔE≤T$f^{-1}$(u) is also suitable. The noise table 14$b$3 in FIG. 16 is a conversion table for realizing this inverse function $f^{-1}$(u) and is a table that outputs a value of the next function with respect to input in which the section [0, 1) is discretized.

$$f_{metro}^{-1}(u) = \log(u) \qquad (3\text{-}1)$$

$$f_{Gibbs}^{-1}(u) = \log\left(\frac{u}{1-u}\right) \qquad (3\text{-}2)$$

To realize the circuit that outputs 1 when −ΔE>T$f^{-1}$(u), the selector 14$b$2 in FIG. 16 may be configured to output −ΔE by inverting the sign of the selected energy change ΔE. The comparator 14$b$5 may be configured to output 1 when the energy change ΔE selected by the selector 14$b$2 ≤T$f^{-1}$(u).

While the transition control unit 14 also includes, for example, a latch circuit that holds a determination result, etc. and a state machine that generates the corresponding timing, these components are not illustrated in FIG. 16 for simplicity.

FIG. 17 is a flowchart illustrating an operation of the transition control unit according to the conventional example. In this operation, first, one state transition is selected as a candidate (step S1). Next, whether to accept the state transition is determined by comparing the energy change corresponding to the state transition with a product of a temperature and a random number (step S2). Next, if the state transition is accepted, the state transition is adopted (step S3). If the state transition is not accepted, the state transition is not adopted (step S3).

While simulated annealing is a versatile method and is very appealing, since the temperature needs to be dropped gradually, a relatively long calculation time is needed. In addition, it is difficult to suitably adjust how the temperature is dropped based on the problem. These problems will hereinafter be described with reference to FIG. 18.

There are many local solutions with poor approximation along state transition paths from an initial value to an optimal solution or an approximate solution. To escape from these local solutions sufficiently quickly, a high temperature that enables sufficient thermal excitation is needed. However, since the energy spread is large in a Boltzmann distribution at a high temperature, the difference between the occupation probability of an optimal solution or a good approximate solution with low energy (hereinafter referred to as a good solution) and the occupation probability of a local solution with relatively high energy and poor approximation (hereinafter referred to as a poor solution) is small. Thus, even if the state transition has escaped from a local solution quickly, the state transition will be stuck at any one of the many subsequent poor solutions. Thus, the probability that the state transition reaches a good solution is very small. To raise the occupation probability of a good solution, a low temperature that achieves sufficiently smaller thermal excitation energy compared with the energy difference from a poor solution is needed. However, in this case, since the thermal excitation energy is small, the probability that the state transition is able to go over energy hills along a path is very low, and as a result, the state rarely changes. Thus, the state transition needs to slowly experience an intermediate temperature that enables the state transition to go over some energy hills and achieves some difference in occupation probability. In this way, the occupation probability of a good solution is increased gradually. If the temperature is dropped excessively slowly, since the temperature is not dropped sufficiently within a finite time, the occupation probability of a good solution is not increased finally. In contrast, if the temperature is dropped excessively quickly, the temperature is dropped before the state transition escapes from a local solution. Thus, the state transition remains stuck at a poor solution. Thus, as the temperature drops more and more, the rate of the change needs to be decreased sufficiently, and sufficient time is needed until a Boltzmann distribution at that temperature is neared.

As described above, in conventional simulated annealing, since escaping from a local solution is sought only by thermal excitation based on the temperature, it is desirable that the temperature be gradually dropped and how the temperature is dropped be suitably adjusted based on the problem.

See, for example, Japanese Laid-open Patent Publication No. 2017-138760

As described above, in simulated annealing, it takes much time for the state transition to escape from a local solution, and a long calculation time is needed to solve the optimization problem.

SUMMARY

According to one aspect, there is provided an optimization apparatus including: a state storage unit configured to hold values of a plurality of state variables included in an evaluation function that represents energy; a calculation unit configured to calculate energy changes of the energy for a plurality of state transitions that occur in response to change of any of the values of the plurality of state variables; a temperature control unit configured to control a temperature; and a transition control unit configured to detect, when stochastically determining based on the temperature, the energy changes, and a random number whether to accept any of the plurality of state transitions according to a relative relationship between the energy changes and thermal excitation energy, a minimum value among the energy changes calculated by the calculation unit for the plurality of state transitions and subtract, when the minimum value is positive, an offset obtained by multiplying the minimum value by a value that is greater than 0 and less than or equal to 1 from each of the energy changes corresponding to the plurality of state transitions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates examples of indexes to be generated;

DESCRIPTION OF EMBODIMENTS

Figure 1:
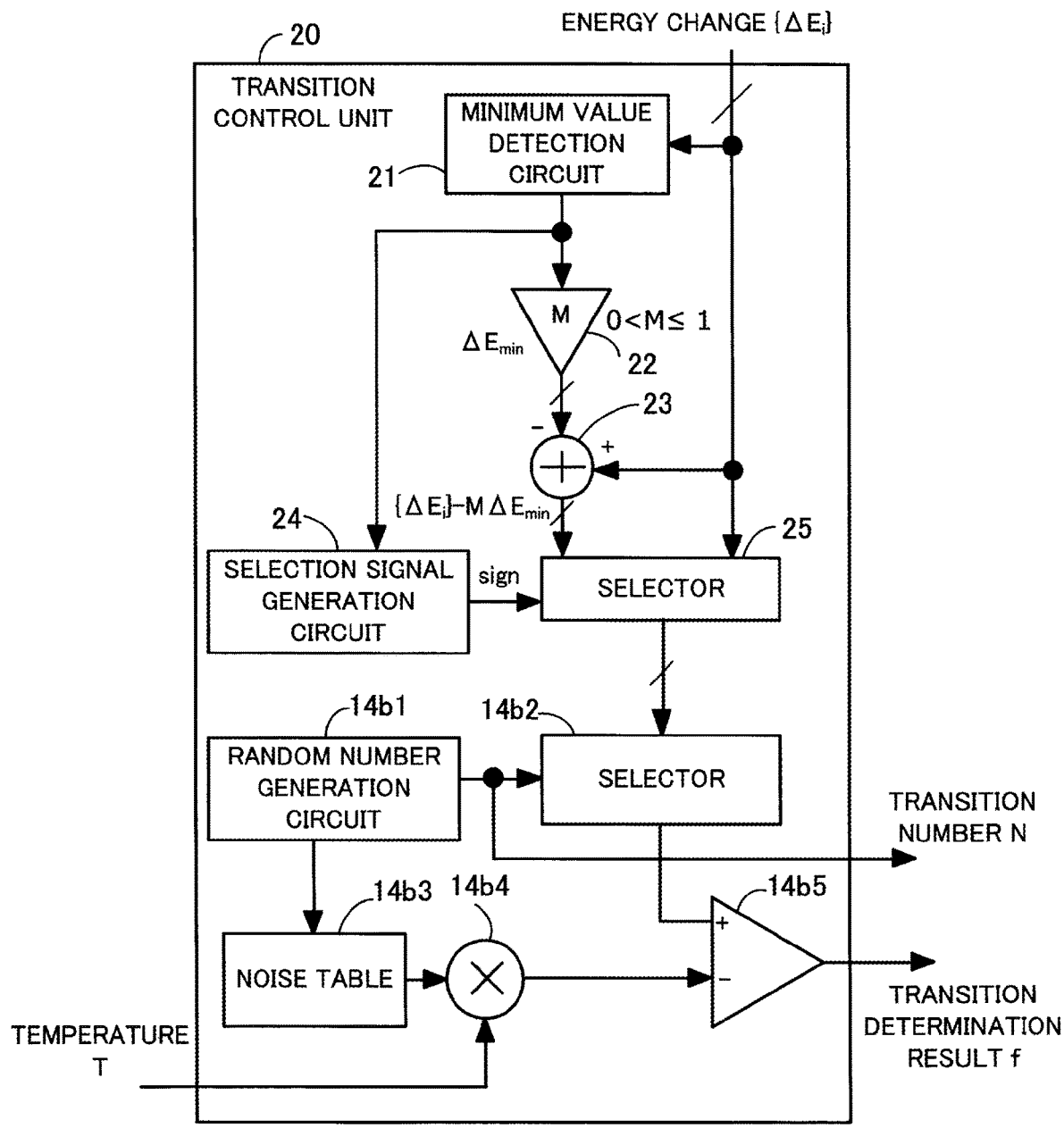
FIG. 1 illustrates an example of a transition control unit of an optimization apparatus according to a first embodiment.

Embodiments will be described below with reference to the accompanying drawings, wherein like reference characters refer to like elements throughout.

First Embodiment

FIG. 1 illustrates an example of a transition control unit in an optimization apparatus according to a first embodiment. The same elements as those in the transition control unit 14 illustrated in FIGS. 15 and 16 are denoted by the same reference characters, and descriptions thereof will be omitted as appropriate.

Figure 15:
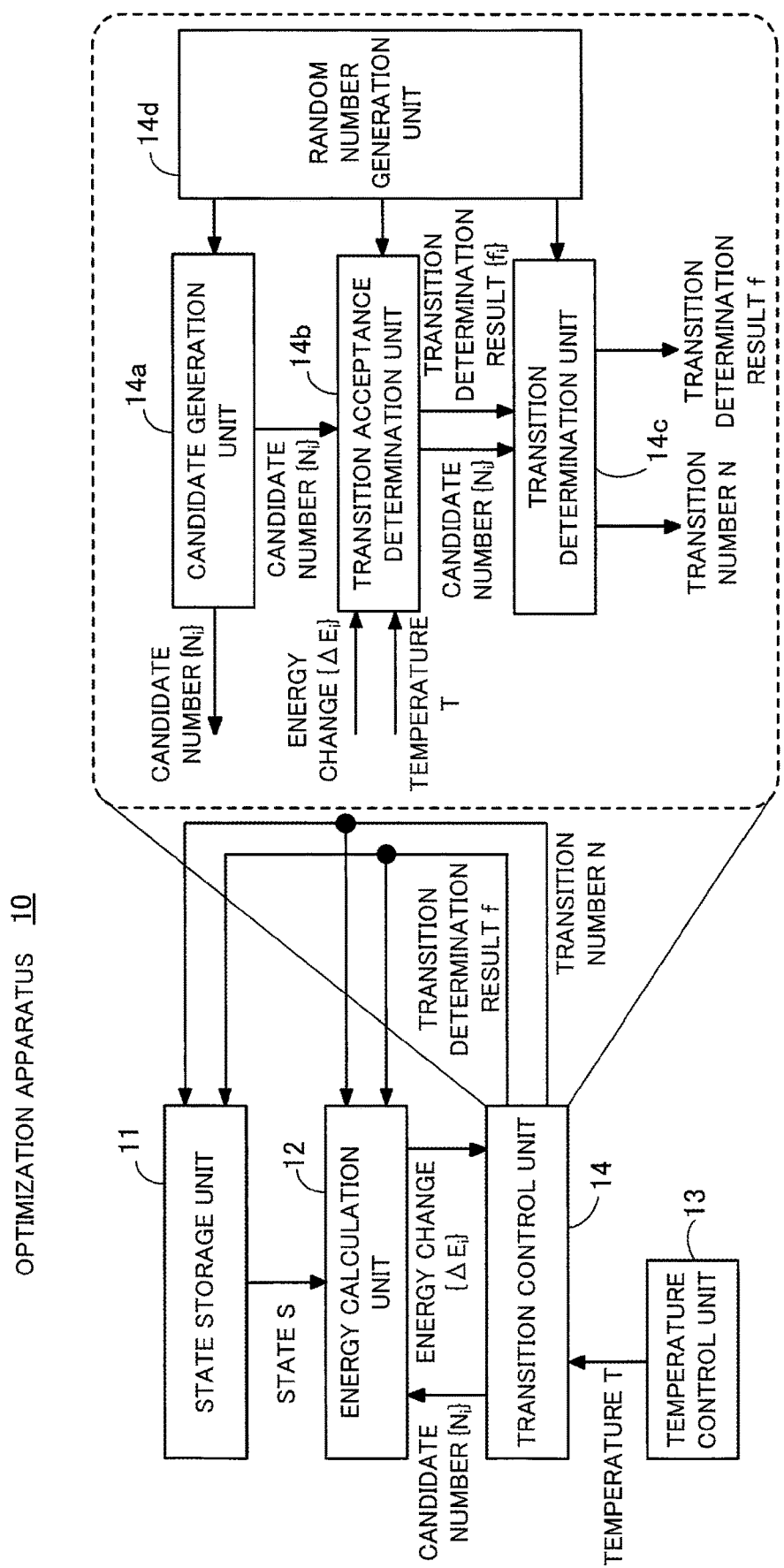
FIG. 15 illustrates a conceptual configuration of an optimization apparatus based on simulated annealing.
Figure 16:
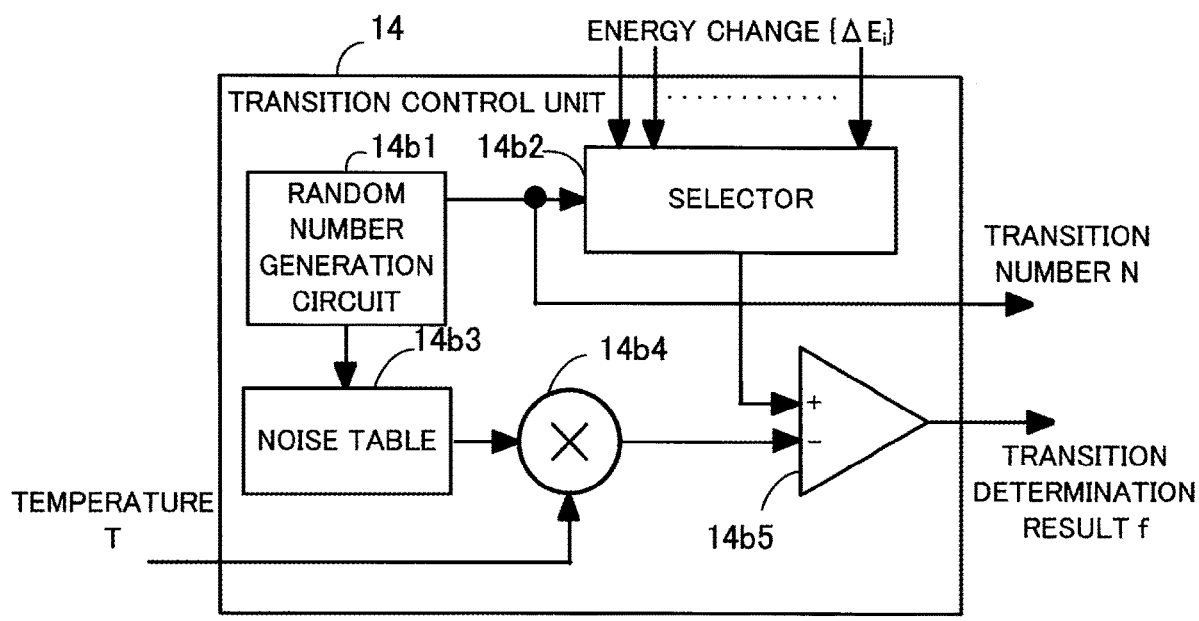
FIG. 16 is a circuit-level block diagram illustrating a configuration example of a transition control unit according to a conventional example, focusing on an arithmetic portion needed for a transition acceptance determination unit.
Figure 17:
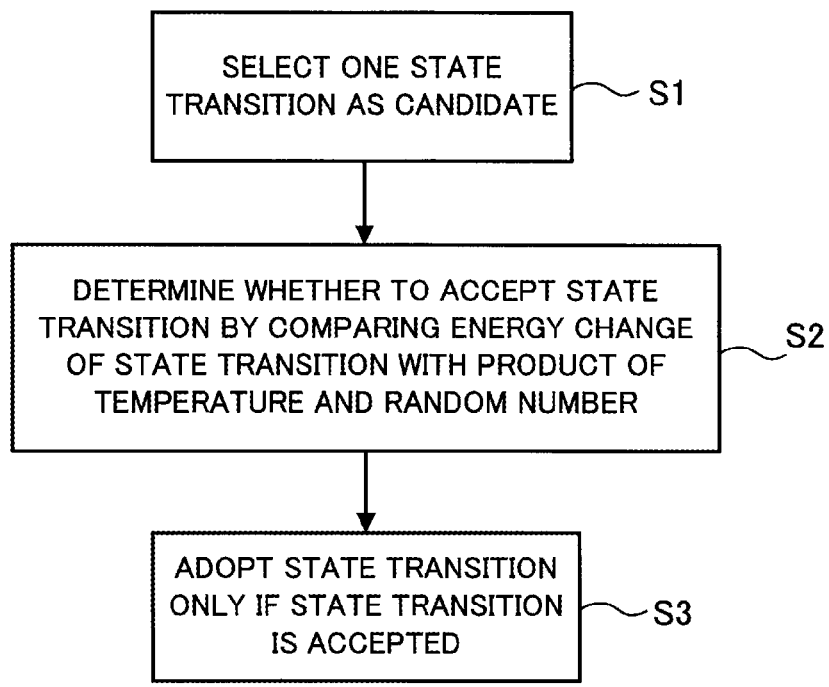
FIG. 17 is a flowchart illustrating an operation of the transition control unit according to the conventional example.
Figure 18:
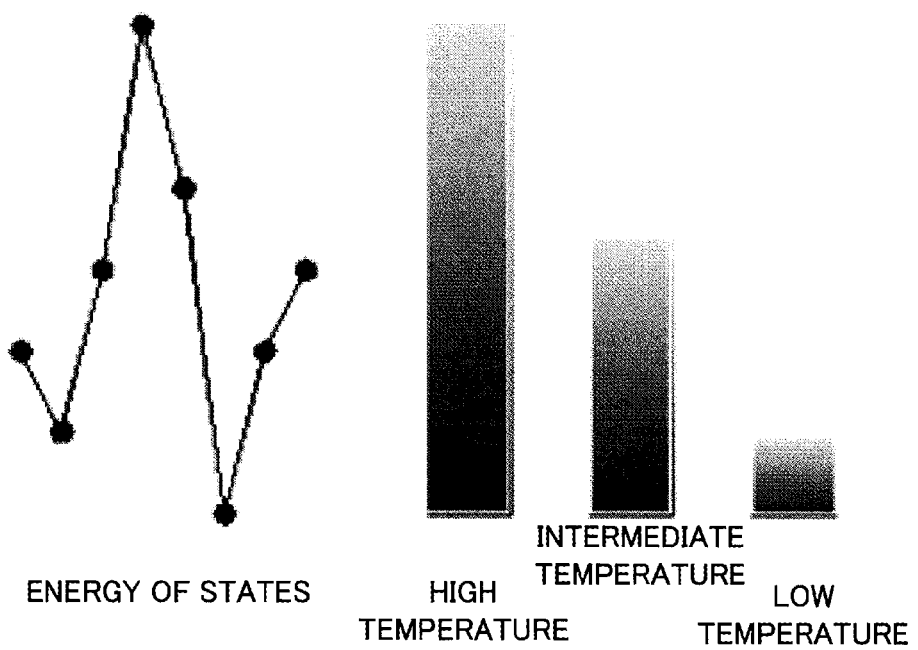
FIG. 18 illustrates a concept of state occupation probabilities based on simulated annealing.

As illustrated in FIG. 1, the transition control unit 20 includes a minimum value detection circuit 21, a multiplication circuit 22, an addition circuit 23, a selection signal generation circuit 24, and a selector 25 added to the circuit portion that realizes the functions of the transition acceptance determination unit 14b illustrated in FIG. 15. The other portions of the transition control unit 20 are the same as the transition control unit 14 illustrated in FIG. 16.

When at least one of the values of a plurality of state variables has changed and at least one state transition from the current state has occurred, the minimum value detection circuit 21 receives an energy change $\{\Delta E_i\}$ of an individual state transition. Next, the minimum value detection circuit 21 detects a minimum value $\Delta E_{min}$ of the energy changes $\{\Delta E_i\}$ of the state transitions.

The multiplication circuit 22 is an arithmetic circuit that outputs values ($M\Delta E_{min}$) each of which is obtained by multiplying the minimum value $\Delta E_{min}$ by a value M ($0<M\le1$).

The addition circuit 23 is an arithmetic circuit that subtracts an individual value $M\Delta E_{min}$ as an offset from the energy changes {$\Delta E_i$} of the state transitions (adds $-M\Delta E_{min}$ to {$\Delta E_i$}). A subtraction circuit may be used instead of the addition circuit 23.

The selection signal generation circuit 24 generates a selection signal sign. When the minimum value $\Delta E_{min}$ is 0 or less, the selection signal generation circuit 24 generates a selection signal sign (for example, 0) that causes the selector 25 to select the energy changes {$\Delta E_i$} of the state transitions. When the minimum value $\Delta E_{min}$ is greater than 0, the selection signal generation circuit 24 generates a selection signal sign (for example, 1) that causes the selector 25 to select the values calculated by the addition circuit 23.

Based on the selection signal sign, the selector 25 selects and outputs the energy changes {$\Delta E_i$} of the state transitions or the values calculated by the addition circuit 23, namely, {$\Delta E_i$}$-M\Delta E_{min}$. The values outputted by the selector 25 are supplied to the selector 14b2. When the selector 25 selects and supplies the energy changes {$\Delta E_i$} to the selector 14b2, the selector 14b2 selects an energy change $\Delta E$ corresponding to a transition number N from the energy changes {$\Delta E_i$}, inverts the sign of the selected energy change $\Delta E$, and outputs $-\Delta E$. When the selector 25 selects and supplies the energy changes ({$\Delta E_i$}$-M\Delta E_{min}$) obtained by subtracting the offset $M\Delta E_{min}$ from the energy changes {$\Delta E_i$} to the selector 14b2, the selector 14b2 selects an energy change $\Delta E - M\Delta E_{min}$ corresponding to the transition number N. Next, the selector 14b2 inverts the sign of the energy change $\Delta E - M\Delta E_{min}$ and outputs $-\Delta E + M\Delta E_{min}$.

When the comparator 14b5 is configured to output 1 when the energy change $\geq Tf^{-1}(u)$, the selector 14b2 does not need to invert the sign as described above.

Figure 2:
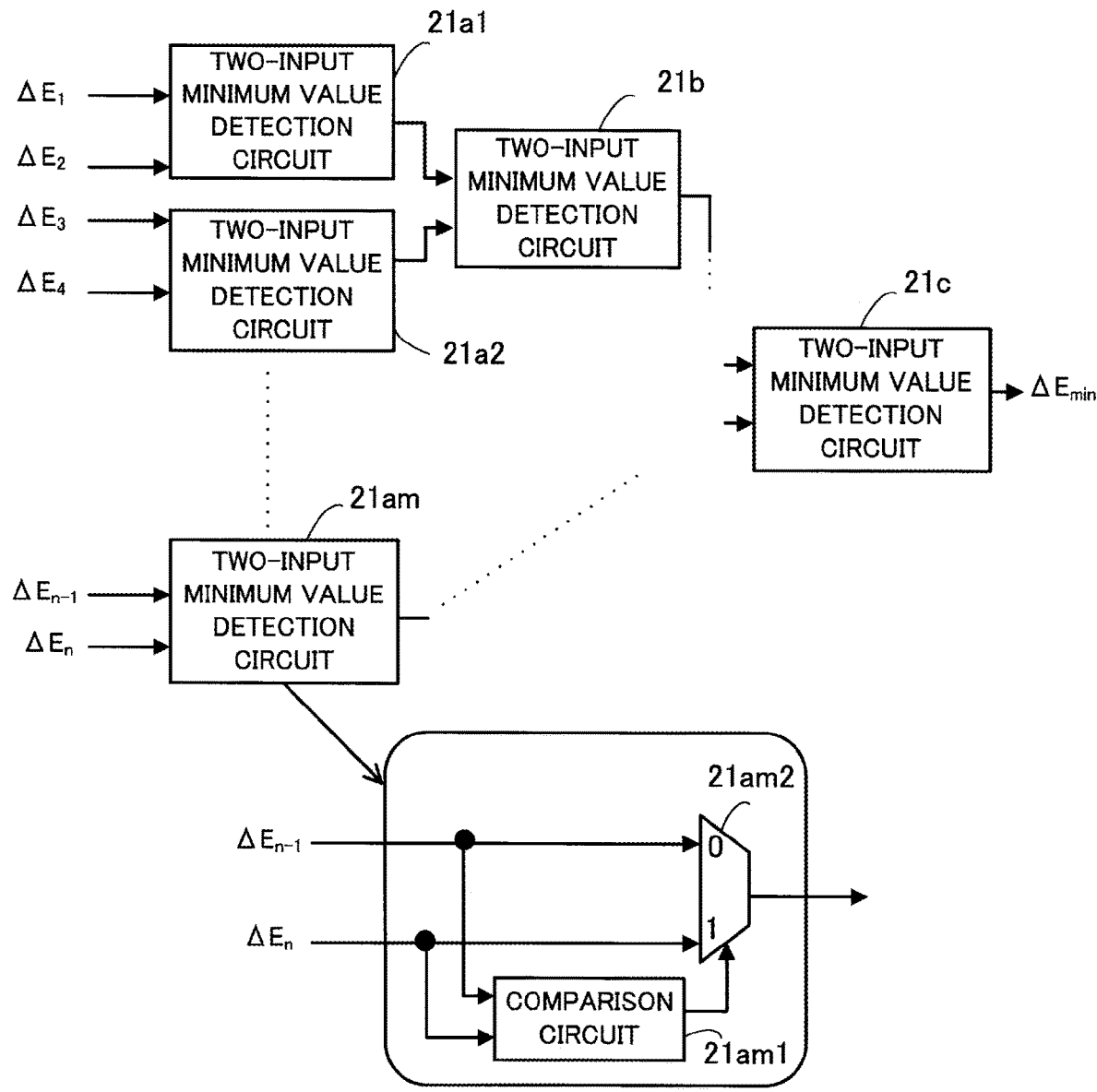
FIG. 2 illustrates an example of a minimum value detection circuit.

FIG. 2 illustrates an example of the minimum value detection circuit.

For example, the minimum value detection circuit 21 is formed by a plurality of stages of two-input minimum value detection circuits arranged in the form of a tournament. Each of the two-input minimum value detection circuits 21a1, 21a2, ..., 21am in the first stage is supplied with energy changes corresponding to state transitions of two state variables among the energy changes {$\Delta E_i$} of the state transitions. For example, among the n state variables, energy changes ($\Delta E_1$ and $\Delta E_2$) corresponding to the state transitions of the first and second state variables are supplied to the two-input minimum value detection circuit 21a1. The two-input minimum value detection circuit 21a1 outputs the smaller one of the two energy changes ($\Delta E_1$ and $\Delta E_2$).

Each of the two-input minimum value detection circuits is realized by, for example, a comparison circuit and a selector. FIG. 2 illustrates a circuit example of the two-input minimum value detection circuit 21am. The two-input minimum value detection circuit 21am includes a comparison circuit 21am1 and a selector 21am2. The comparison circuit 21am1 compares the two energy changes ($\Delta E_{n-1}$ and $\Delta E_n$) supplied thereto and outputs 0 when $\Delta E_{n-1} < \Delta E_n$ and outputs 1 when $\Delta E_n < \Delta E_{n-1}$. The selector 21am2 outputs $\Delta E_{n-1}$ when 0 is outputted by the comparison circuit 21am and outputs $\Delta E_n$ when 1 is outputted by the comparison circuit 21am.

Each of the two-input minimum value detection circuits in the second and subsequent stages outputs the smaller one of the energy changes outputted by the two two-input minimum value detection circuits in the previous stage. For example, the two-input minimum value detection circuit 21b in the second stage selects and outputs the smaller one of the energy changes outputted by the two-input minimum value detection circuits 21a1 and 21a2 in the previous stage.

In the case of this minimum value detection circuit 21, the energy change outputted by the two-input minimum value detection circuit 21c in the last stage is the minimum value $\Delta E_{min}$.

By using the transition control unit 20 as described above, the acceptance probability of the state transition at a local solution is increased, and escaping from the local solution is accelerated. The reason will hereinafter be described.

Figure 3:
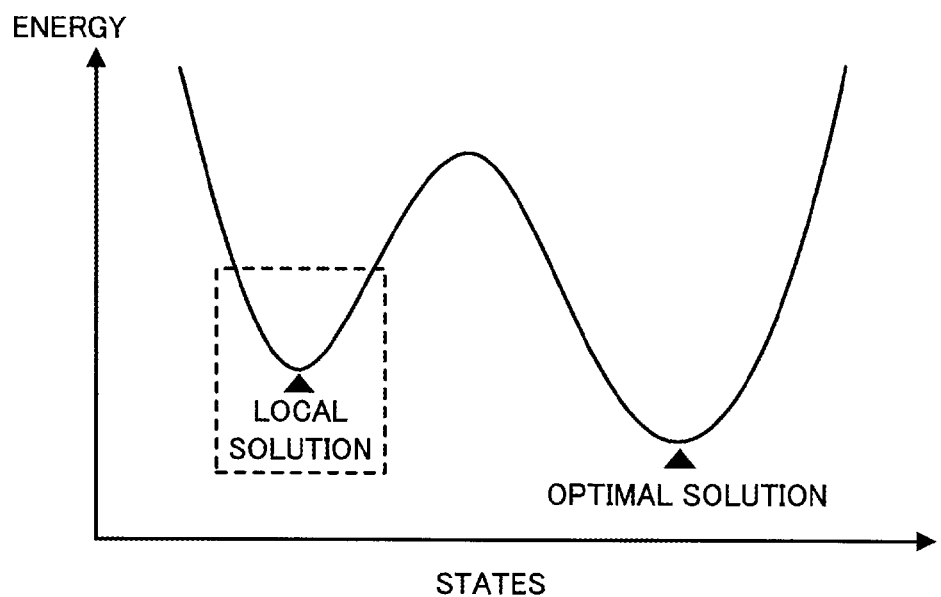
FIG. 3 illustrates an example of an energy distribution with respect to states.

FIG. 3 illustrates an example of an energy distribution with respect to states. In FIG. 3, the horizontal axis represents states (combinations of values of state variables), and the vertical axis represents the energy.

FIG. 3 illustrates a state (an optimal solution) in which the energy represents the minimum value and a state (a local solution) in which the energy represents a locally minimum value, which is not the minimum value.

As expressed by the above formulas 1-1 to 1-3, as the temperature decreases or as the energy change increases (positively), the state transition acceptance probability decreases.

Figure 4:
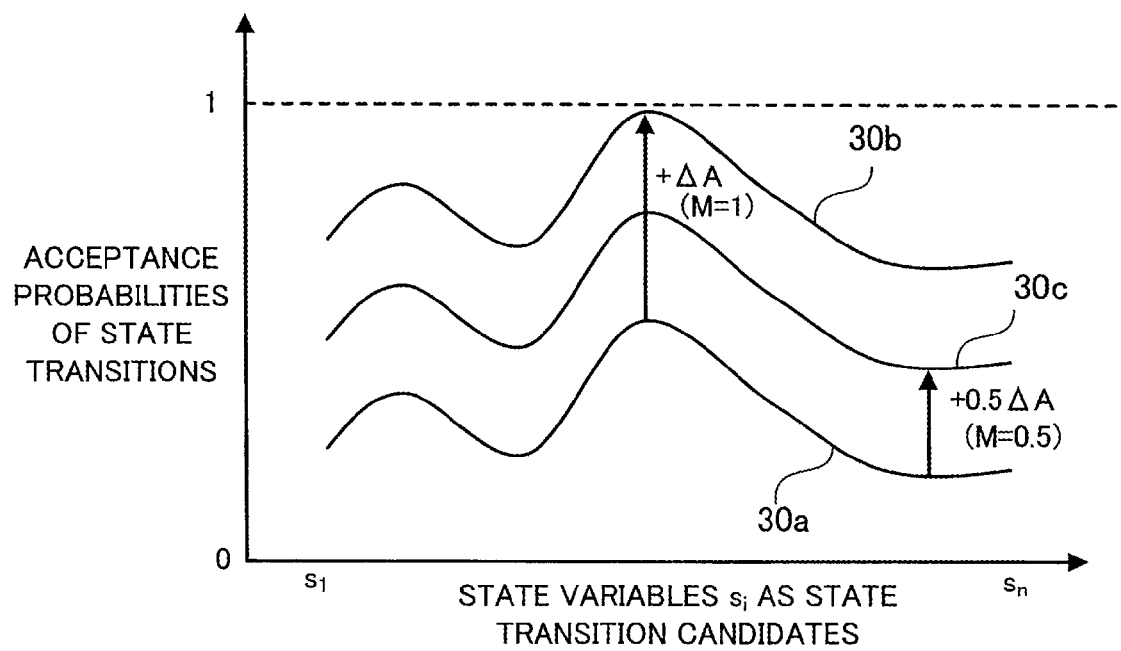
FIG. 4 illustrates an example of the probability of acceptance of an individual state transition with Hamming distance 1 at a local solution.

FIG. 4 illustrates an example of the probability of acceptance of an individual state transition with Hamming distance 1 at a local solution. In FIG. 4, the horizontal axis represents state variables $s_i$ as state transition candidates, and the vertical axis represents the acceptance probabilities of the individual state transitions. A waveform 30a indicates the acceptance probabilities that the individual state transitions with Hamming distance 1 at a local solution are accepted (an individual state transition in which one of the values of the state variables $s_1$ to $s_n$ changes). In the case of the waveform 30a, the acceptance probabilities are much smaller than 1. Thus, a state transition is not likely to occur, and it takes time to escape from the local solution.

As illustrated in FIG. 4, by adding a value ($M\Delta A$) obtained by multiplying a difference $\Delta A$ between the maximum value of the acceptance probability of the waveform 30a and 1 by M ($0 < M \leq 1$) to the individual state transition acceptance probabilities, the acceptance probabilities are appropriately increased without excessively increasing the state transition acceptance probabilities. A waveform 30b indicates the acceptance probabilities when $\Delta A$ is added to the acceptance probabilities indicated by the waveform 30a (namely, when M=1), and a waveform 30c indicates the acceptance probabilities when $0.5\Delta A$ is added to the acceptance probabilities indicated by the waveform 30a (namely, when M=0.5).

As expressed by formulas 1-1 to 1-3, as the smaller the energy change is, the greater the state transition acceptance probability will be. When the energy change is 0 or less, the acceptance probability reaches the maximum value (=1). Thus, among the energy changes {$\Delta E_i$} of the state transitions, when the minimum value $\Delta E_{min}$ is positive, by subtracting a value ($M\Delta E_{min}$) obtained by multiplying the minimum value $\Delta E_{min}$ by M from the individual state transition energy changes {$\Delta E_i$}, the acceptance probabilities are increased, as illustrated in FIG. 4.

Figure 5:
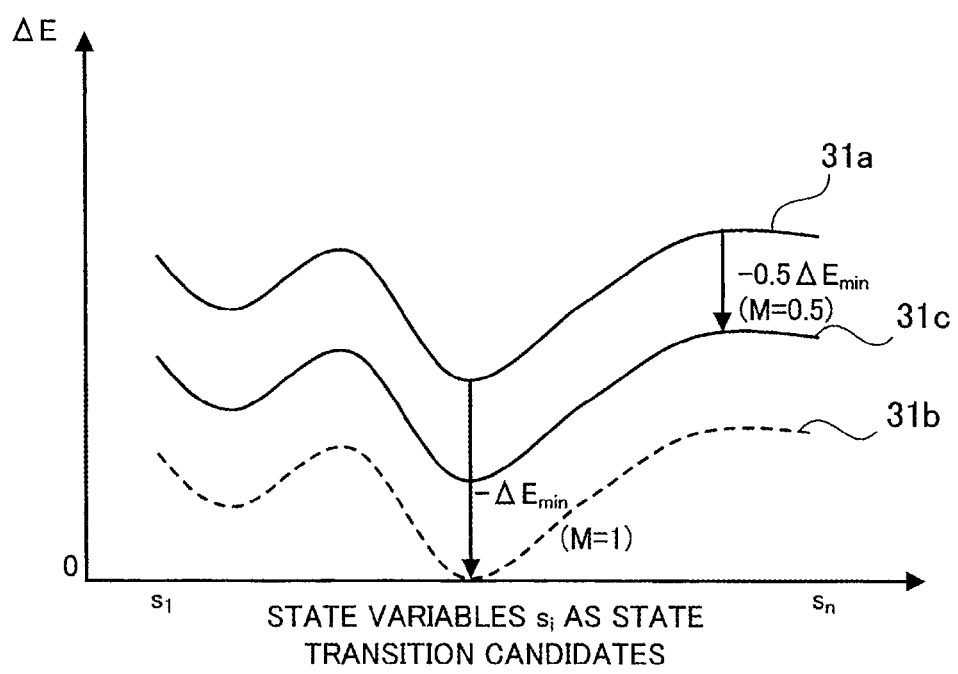
FIG. 5 illustrates an example of application of offsets to energy changes by a transition control unit of an optimization apparatus according to a second embodiment.

FIG. 5 illustrates an example of application of offsets to energy changes by a transition control unit of an optimization apparatus according to a second embodiment. In FIG. 5, the horizontal axis represents state variables $s_i$ as state transition candidates, and the vertical axis represents $\Delta E$.

A waveform 31a indicates an example of the energy changes {$\Delta E_i$} of state transitions at a local solution. In the case of the waveform 31a, by subtracting as an offset a value ($M\Delta E_{min}$) obtained by multiplying the minimum value $\Delta E_{min}$ by M from the energy changes {$\Delta E_i$} of individual state transitions, the acceptance probabilities are increased as described above. A waveform 31b indicates energy changes when the minimum value $\Delta E_{min}$ is subtracted from the energy changes $\{\Delta E_i\}$ indicated by the waveform 31a (namely, when M=1). When M=1, the minimum value of the energy changes $\Delta E$ indicated by the waveform 31b reaches 0, and the acceptance probability of the state transition corresponding to the minimum value reaches 1. In addition, a waveform 31c indicates energy changes when 0.5$\Delta E_{min}$ is subtracted from the energy changes $\{\Delta E_i\}$ indicated by the waveform 31a (namely, M=0.5).

The convergence theorem of simulated annealing indicates that a good result is obtained if whether to accept an individual state transition is determined in accordance with the state transition probability of a Metropolis method or a Gibbs method. Since the probabilities of state transitions are very small at local solutions, selection of a transition candidate is performed many times, and the branch ratio of the subsequent state transitions is proportional to the transition probability of a Metropolis method or Gibbs method. Thus, if the transition control unit increases the absolute values of the acceptance probabilities of the individual state transitions while maintaining the relative ratio of these acceptance probabilities, the branch ratio of the individual state transitions is maintained. Thus, the transition control unit is able to shorten the time for which the state is stuck at a local solution, without negatively affecting the convergence. As a result, the calculation time is shortened.

As described above, by subtracting M$\Delta E_{min}$ as an offset from the energy changes $\{\Delta E_i\}$ of the individual state transitions, the transition control unit is able to increase the absolute values of the acceptance probabilities while maintaining the relative ratio of the acceptance probabilities of the individual state transitions as illustrated in FIG. 4. Thus, the transition control unit is able to shorten the time for which the state is stuck at a local solution, without negatively affecting the convergence. As a result, the calculation time is shortened.

In simulated annealing in which the energy to be optimized is expressed by an ising model and in optimization based on a Boltzmann machine almost equivalent to the simulated annealing, a method for generating transition candidates and calculating the energy changes associated with state transitions will briefly be described.

An ising model is a model that represents a system formed by N spins that interact with each other. An individual spin $s_i$ (corresponding to an individual state variable described above) is represented by a binary value of ±1. The energy in the system is expressed by the following formula 4.

$$E = \frac{1}{2}\sum_{i,j} J_{i,j}s_is_j + \sum_i h_is_i \quad (4)$$

In formula 4, $J_{i,j}$ represents an interaction coefficient between spins $s_i$ and $s_j$, and $h_i$ represents an external magnetic field coefficient, which is a bias value in the system.

A state transition candidate from the current state to the next state is a single spin flip, and there are N candidates. Thus, as the transition candidates, the number of a single spin that is flipping or a group of the numbers of a plurality of spins that are flipping may be generated.

Change of the energy associated with a flip of the i-th spin is expressed by the following formula 5.

$$\Delta E_i = -2s_i\frac{\partial E}{\partial s_i} = -2s_i\left(\sum_j J_{i,j}s_j + h_i\right) \quad (5)$$

In the following formula 6, $F_i$ referred to as a local field value represents the rate of change of the energy associated with a flip of an individual spin.

$$F_i = \sum_j J_{i,j}s_j + h_i \quad (6)$$

Since whether to accept the state transition is determined based on change of the energy, basically, change of the energy is calculated from the local field value, instead of calculating the energy itself. When the state corresponding to the lowest energy obtained as the output is used, the energy is obtained by calculating change of the energy from the local field value and accumulating the results.

In addition, the following mathematical formula is obtained.

$$\frac{\partial}{\partial s_j}F_i = J_{i,j} \quad (7)$$

Thus, there is no need to recalculate the local field value from a matrix operation every time. Only the amount of change due to a flip of a spin associated with a state transition is added. Thus, the state storage unit 11 and the energy calculation unit 12 illustrated in FIG. 15 are realized by relatively simple arithmetic circuits such as an N-bit register that holds the values of the N spins, an adder, and an exclusive or.

In addition, an optimization method based on a Boltzmann machine used in a neural network is the same as the simulated annealing using an ising model with the exception that an individual state variable corresponding to an individual spin is indicated by a binary value (0, 1). The energy, the energy change, and the local field value in a Boltzmann machine are expressed by the following formulas 8 to 10.

$$E = \frac{1}{2}\sum_{i,j} J_{i,j}s_is_j + \sum_i h_is_i \quad (8)$$

$$\Delta E_i = (1 - 2s_i)\frac{\partial E}{\partial s_i} = (1 - 2s_i)\left(\sum_j J_{i,j}s_j + h_i\right) \quad (9)$$

$$F_i = \sum_j J_{i,j}s_j + h_i \quad (10)$$

In many cases, a neuron in a Boltzmann machine corresponds to a spin in an ising model.

As described above, simulated annealing using an ising model is equivalent to simulated annealing using a Boltzmann machine. Thus, these simulated annealings are mutually convertible.

In simulated annealing using a Boltzmann machine (and simulated annealing using an ising model), only one state variable changes in association with a state transition, the energy change corresponding to this change is previously calculable by using a local field value. Thus, in FIG. 1, an implementation example in which previously calculated energy changes are selected based on generation of transition candidates is illustrated. However, in a non-Boltzmann machine, there are cases where transitions in which a plurality of state variables change need to be considered. In these cases, an implementation in which needed energy changes after generation of transition candidates are calculated could be more advantageous.

Second Embodiment

Figure 6:
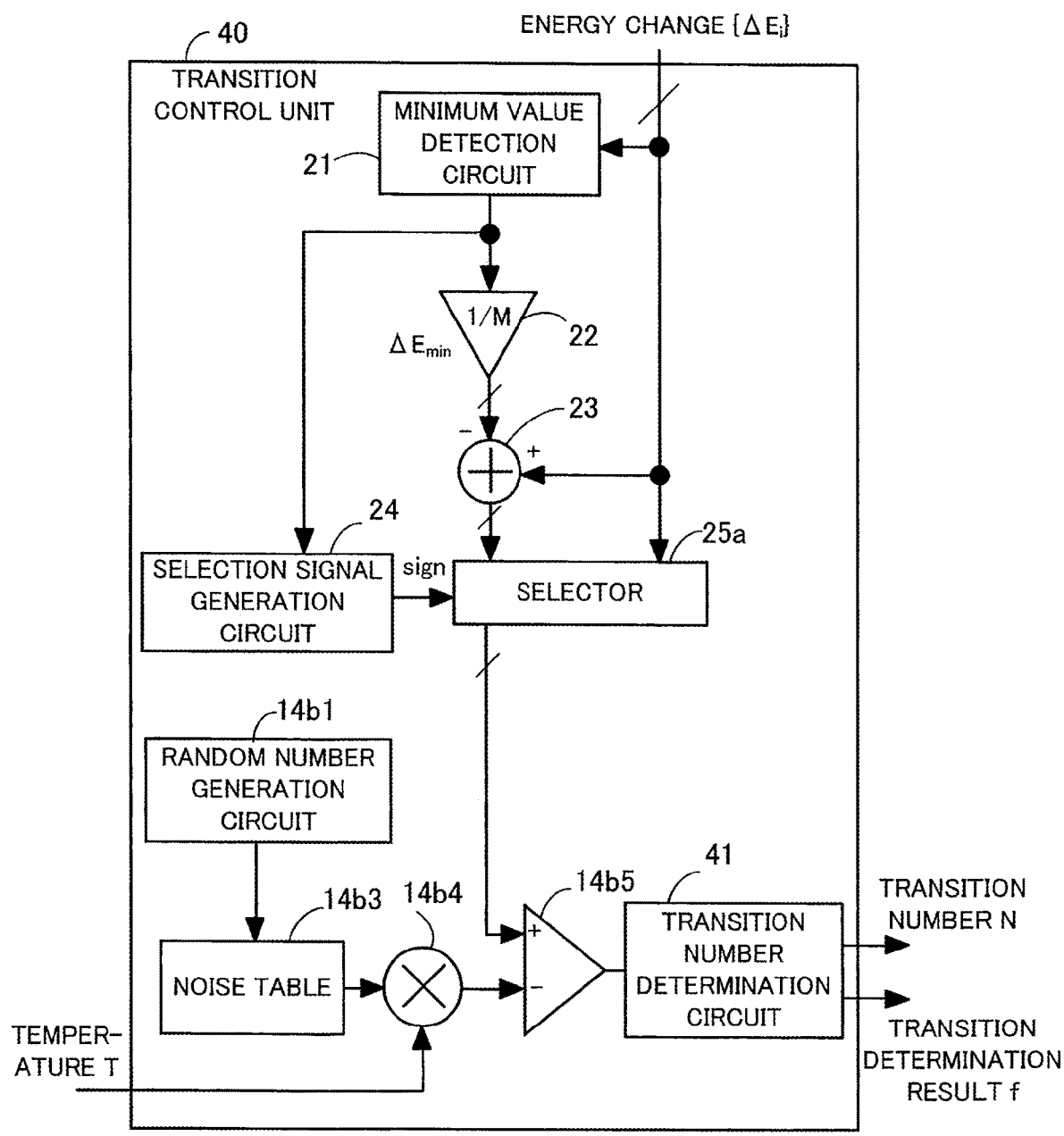
FIG. 6 illustrates an example of the transition control unit of the optimization apparatus according to the second embodiment.

FIG. 6 illustrates an example of the transition control unit of the optimization apparatus according to the second embodiment. The same elements as those in the transition control unit 20 illustrated in FIG. 1 are denoted by the same reference characters, and descriptions thereof will be omitted.

The transition control unit 40 illustrated in FIG. 6 does not include the selector 14b2, and the output from a selector 25a is supplied to a non-inverting input terminal of a comparator 14b5. In addition, an output terminal of the comparator 14b5 is connected to a transition number determination circuit 41.

As in the selector 25, the selector 25a selects, based on a selection signal sign, the energy changes $\{\Delta E_i\}$ of the respective state transitions or the values calculated by an addition circuit 23, namely, the energy changes $\{\Delta E_i\}$−$M\Delta E_{min}$ obtained by subtracting an offset from energy changes $\{\Delta E_i\}$. Next, the selector 25a inverts the signs of the selected energy changes and outputs the energy changes.

The comparator 14b5 outputs comparison results, each of which is a comparison result between an individual −$\{\Delta E_i\}$ or −$\{\Delta E_i\}$+$M\Delta E_{min}$ and a product (corresponding to thermal excitation energy) outputted by the multiplier 14b4, as transition determination results $\{f_i\}$. For example, assuming that the energy change associated with a state transition of the k-th state variable $s_k$ is denoted by $\Delta E_k$, when −$\Delta E_k$ or −$\Delta E_k$+$M\Delta E_{min}$ is greater than the product outputted by the multiplier 14b4, the transition determination result f of the state variable $s_k$ indicates 1. When −$\Delta E_k$ or −$\Delta E_k$+$M\Delta E_{min}$ is less than the product outputted by the multiplier 14b4, the transition determination result f of the state variable $s_k$ indicates 0.

When the comparator 14b5 is configured to output 1 when the energy change ≤$Tf^{-1}(u)$, the selector 25a does not need to invert the sign as described above.

The transition number determination circuit 41 preferentially selects, based on the transition determination results $\{f_i\}$ of the individual state transitions outputted by the comparator 14b5, a state transition determined to be accepted by the comparator 14b5 and outputs the transition number N and the transition determination result f of the selected state transition.

Hereinafter, a circuit example of the transition number determination circuit 41 when the number of state variables is 1,024 will be described. The following description assumes that the comparator 14b5 outputs 1 as a transition determination result $\{f_i\}$ when the comparator 14b5 determines to accept a state transition and outputs 0 otherwise.

Figure 7:
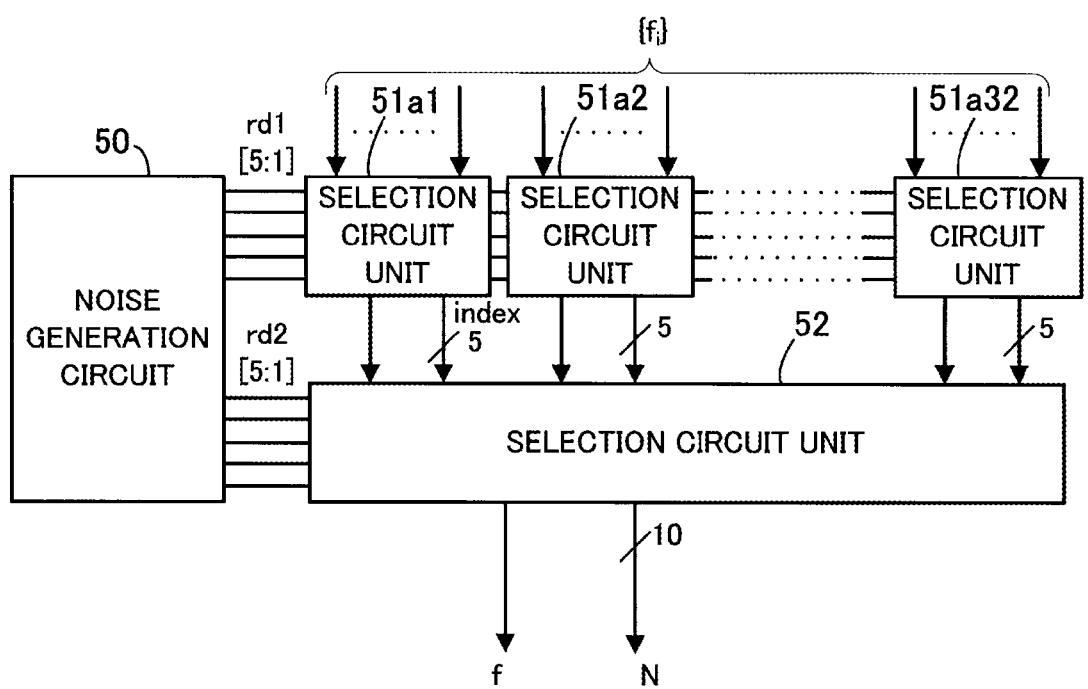
FIG. 7 illustrates an example of a transition number determination circuit.

FIG. 7 illustrates an example of the transition number determination circuit.

The transition number determination circuit 41 includes a noise generation circuit 50 and selection circuit units 51a1, 51a2, . . . , 51a32, and 52.

The noise generation circuit 50 generates and outputs 5-bit random numbers rd1 and rd2 as noise values. Different seeds (initial values) are used for the random numbers rd1 and rd2. For example, a linear feedback shift register (LFSR) or the like may be used as the noise generation circuit 50.

Each of the selection circuit units 51a1 to 51a32 receives 32 state transition determination results $\{f_i\}$ of the 1,024 transition determination results $\{f_i\}$. Each of the selection circuit units 51a1 to 51a32 selects and outputs one of the 32 transition determination results based on the 5-bit random number rd1. In addition, each of the selection circuit units 51a1 to 51a32 generates and outputs a 5-bit index that indicates the one transition determination result selected from the respective 32 state transition determination results.

The selection circuit unit 52 receives the transition determination results and the 5-bit indexes outputted from the selection circuit units 51a1 to 51a32. Next, based on the transition determination results, the indexes, and the 5-bit random number rd2, the selection circuit unit 52 selects and outputs one transition determination result f of the 32 transition determination results and generates and outputs a 10-bit transition number N.

Figure 8:
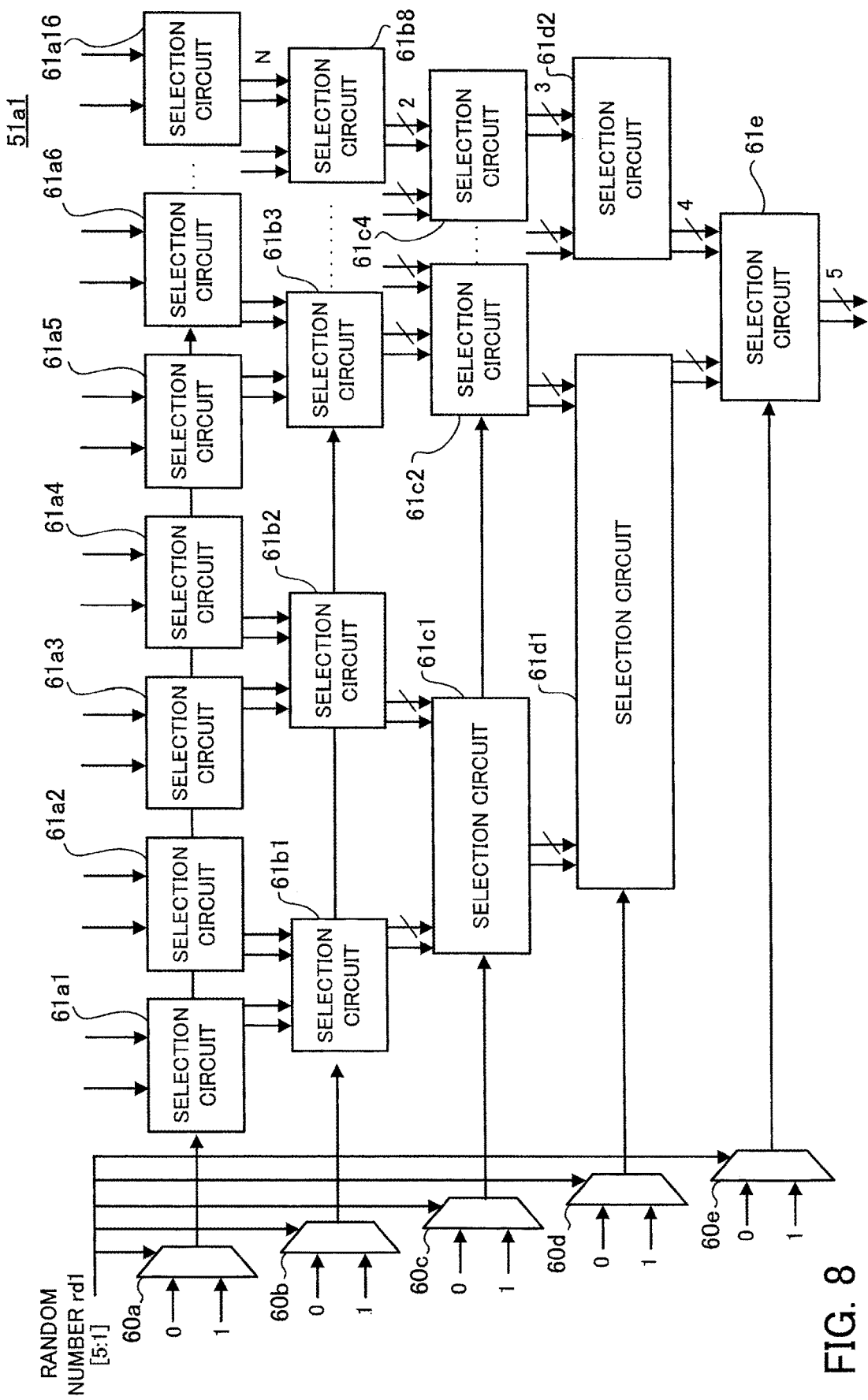
FIG. 8 illustrates an example of a selection circuit unit.

FIG. 8 illustrates an example of a selection circuit unit.

In FIG. 8, an example of the selection circuit unit 51a1 is illustrated. Each of the selection circuit units 51a2 to 51a32 is also realized by the same circuit as that of the selection circuit unit 51a1.

The selection circuit unit 51a1 includes selection circuits 60a to 60e. The selection circuit unit 51a1 also includes selection circuits 61a1 to 61a16, 61b1 to 61b8, 61c1 to 61c4, 61d1 and 61d2, and 61e. These selection circuits 61a1 to 61a16, 61b1 to 61b8, 61c1 to 61c4, 61d1 and 61d2, and 61e are connected in a tree shape in five stages.

The selection circuit 60a supplies 0 or 1 to the selection circuits 61a1 to 61a16 in the first stage based on the value of the first bit of the 5-bit random number rd1. The selection circuit 60b supplies 0 or 1 to the selection circuits 61b1 to 61b8 in the second stage based on the value of the second bit of the 5-bit random number rd1. The selection circuit 60c supplies 0 or 1 to the selection circuits 61c1 to 61c4 in the third stage based on the value of the third bit of the 5-bit random number rd1. The selection circuit 60d supplies 0 or 1 to the selection circuits 61d1 and 61d2 in the fourth stage based on the value of the fourth bit of the 5-bit random number rd1. The selection circuit 60e supplies 0 or 1 to the selection circuit 61e in the fifth stage based on the value of the fifth bit of the 5-bit random number rd1.

Each of the selection circuits 61a1 to 61a16 in the first stage receives two of the 1,024 state transition determination results {fi}. Next, based on the values of the corresponding transition determination results and 0 or 1 outputted by the selection circuit 60a, each of the selection circuits 61a1 to 61a16 selects and outputs one of the two transition determination results and generates and outputs a 1-bit index that indicates the determination result that it has selected.

Each of the selection circuits 61b1 to 61b8 in the second stage receives two of the 16 transition determination results and two of the 16 indexes outputted by the selection circuits 61a1 to 61a16. Next, based on the values of the corresponding transition determination results and 0 or 1 outputted by the selection circuit 60b, each of the selection circuits 61b1 to 61b8 selects and outputs one of the two transition determination results and generates and outputs a 2-bit index that indicates the determination result that it has selected.

Each of the selection circuits 61c1 to 61c4 in the third stage receives two of the eight transition determination results and two of the eight indexes outputted by the selection circuits 61b1 to 61b8. Next, based on the values of the corresponding transition determination results and 0 or 1 outputted by the selection circuit 60c, each of the selection circuits 61c1 to 61c4 selects and outputs one of the two transition determination results and generates and outputs a 3-bit index that indicates the determination result that it has selected.

Each of the selection circuits 61d1 and 61d2 in the fourth stage receives two of the four transition determination results and two of the four indexes outputted by the selection circuits 61c1 to 61c4. Next, based on the values of the corresponding transition determination results and 0 or 1 outputted by the selection circuit 60d, each of the selection circuits 61d1 and 61d2 selects and outputs one of the two transition determination results and generates and outputs a 4-bit index that indicates the determination result that it has selected.

The selection circuit 61e in the fifth stage receives the two transition determination results and the two indexes outputted by the selection circuits 61d1 and 61d2. Next, based on the values of the transition determination results and 0 or 1 outputted by the selection circuit 60e, the selection circuit 61e selects and outputs one of the two transition determination results and generates and outputs a 5-bit index that indicates the determination signal that it has selected.

The selection circuit unit 52 illustrated in FIG. 7 is realized by almost the same circuit configuration as that of the selection circuit unit 51a1. Specifically, in the case of the selection circuit unit 52, each of the selection circuits 61a1 to 61a16 in the first stage receives two of the 32 transition determination results and two of the 32 5-bit indexes outputted by the selection circuit units 51a1 to 51a32. Next, after selection of the transition determination results and addition of the index bits in an individual stage, a 10-bit transition number N and a finally selected transition determination result f are outputted.

Figure 9:
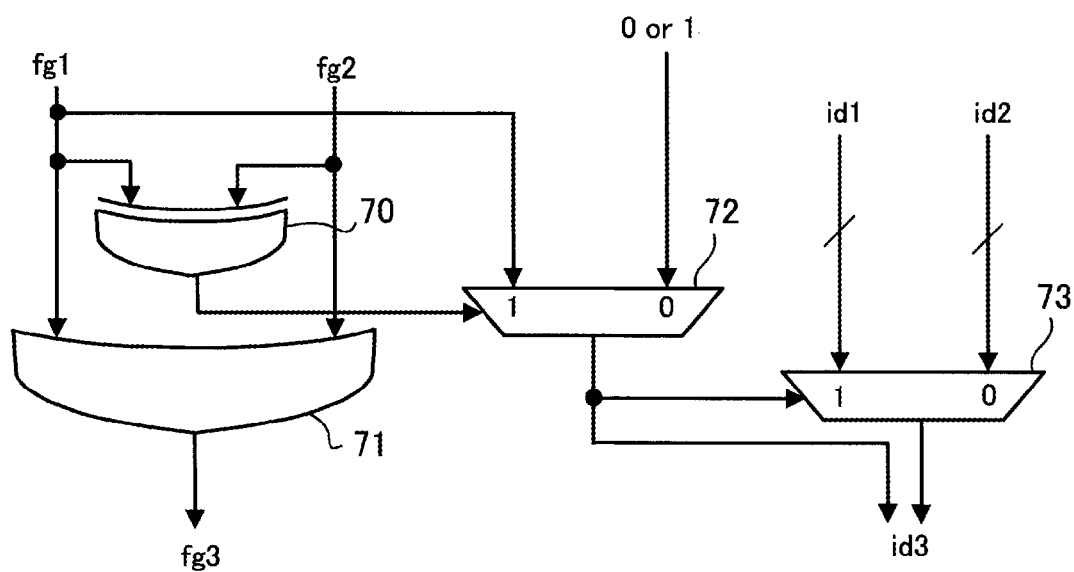
FIG. 9 illustrates an example of a selection circuit.

FIG. 9 illustrates an example of a selection circuit.

In FIG. 9, an example of the selection circuit 61b1 in FIG. 8 is illustrated. Each of the selection circuits 61b2 to 61b8, 61c1 to 61c4, 61d1 and 61d2, and 61e is also realized by a similar circuit configuration.

The selection circuit 61b1 includes an exclusive OR (XOR) circuit 70, an OR circuit 71, and selection circuit 72 and 73.

the XOR circuit 70 receives the transition determination results outputted by the selection circuits 61a1 and 61a2 in the first stage. In FIG. 9, fg1 denotes the transition determination result outputted by the selection circuit 61a1, and fg2 denotes the transition determination result outputted by the selection circuit 61a2. The XOR circuit 70 outputs 0 when fg1 and fg2 represent the same value and outputs 1 otherwise.

The OR circuit 71 receives fg1 and fg2. When at least one of fg1 and fg2 represents 1, the OR circuit 71 outputs 1 as the transition determination result (denoted by fg3). When both fg1 and fg2 represent 0, the OR circuit 71 outputs 0 as fg3.

The selection circuit 72 receives fg1 and 0 or outputted by the selection circuit 60b. When the XOR circuit 70 outputs 1, the selection circuit 72 selects and outputs the value of fg1. When the XOR circuit 70 outputs 0, the selection circuit 72 selects and outputs the value outputted by the selection circuit 60b.

The selection circuit 73 receives the indexes outputted by the selection circuits 61a1 and 61a2 in the first stage. In FIG. 9, the index outputted by the selection circuit 61a1 is denoted by id1, and the index outputted by the selection circuit 61a2 is denoted by id2. When the selection circuit 72 outputs 1, the selection circuit 73 selects and outputs the value of id1. When the selection circuit 72 outputs 0, the selection circuit 73 selects and outputs the value of id2.

A value obtained by adding the 1-bit value outputted by the selection circuit 72 to the value of id1 or id2 outputted by the selection circuit 73 (added to an upper bit) is the index (denoted by id3 in FIG. 9) outputted by the selection circuit 61b1.

Each of the selection circuits 61a1 to 61a16 in the first stage illustrated in FIG. 8 is also realized by almost the same circuit configuration as that illustrated in FIG. 9. Specifically, each of the selection circuits 61a1 to 61a16 does not include the selection circuit 73.

FIG. 10 illustrates examples of indexes to be generated.

When the selection circuit 60b outputs 1 and when the two transition determination results (fg1 and fg2) supplied to the selection circuit 61b1 illustrated in FIG. 9 represent the same value, the selection circuit 61b1 outputs, as id3, a value obtained by adding a new bit 1 to an upper bit of id1. In addition, when the selection circuit 60b outputs 1 and when fg1 and fg2 represent 1 and 0, respectively, the selection circuit 61b1 also outputs the value, as id3, the value obtained by adding the new bit 1 to the upper bit of id1. However, when the selection circuit 60b outputs 1 and when fg1 and fg2 represent 0 and 1, respectively, the selection circuit 61b1 outputs, as id3, a value obtained by adding a new bit 011 to an upper bit of id2.

When the selection circuit 60b outputs 0 and when fg1 and fg2 represent the same value, the selection circuit 61b1 outputs, as id3, a value obtained by adding a new bit 0 to the upper bit of id2. In addition, when the selection circuit 60b outputs 0 and when fg1 and fg2 represent 1 and 0, respectively, the selection circuit 61b1 also outputs, as id3, the value obtained by adding the new bit 1 to the upper bit of id1. In addition, when the selection circuit 60b outputs 0 and when fg1 and fg2 represent 0 and 1, respectively, the selection circuit 61b1 outputs, as id3, the value obtained by adding the new bit 0 to the upper bit of id2.

In addition, when at least one of fg1 and fg2 represents 1, fg3 represents 1. When both fg1 and fg2 represent 0, fg3 represents 0.

By using the transition number determination circuit 41 as described above, a state transition to be accepted is selected preferentially. Thus, since the state transition frequency is increased, the calculation time is expected to shorten further.

COMPARATIVE EXAMPLE

Figure 11:
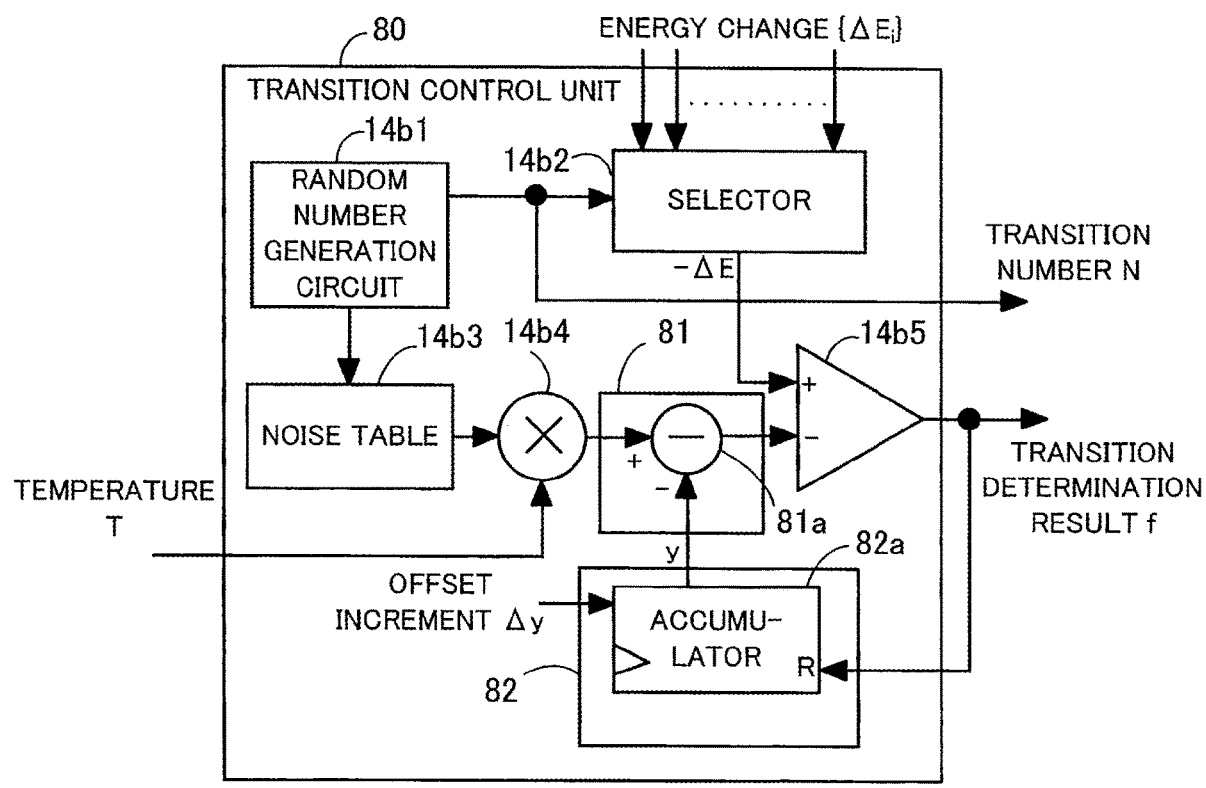
FIG. 11 illustrates an example of a transition control unit that increases a transition acceptance probability by a certain offset increment.

FIG. 11 illustrates an example of a transition control unit that increases the transition acceptance probability by a certain offset increment.

A transition control unit 80 includes an offset addition circuit 81 and an offset control circuit 82 added to the circuit portion that realizes the functions of the transition acceptance determination unit 14b illustrated in FIG. 15. The other portions of the transition control unit 80 are the same as the transition control unit 14 illustrated in FIGS. 15 and 16.

The offset addition circuit 81 adds an offset y to $-\Delta E$. In the circuit example in FIG. 11, the offset addition circuit 81 is a subtractor 81a. Thus, in the example in FIG. 11, instead of adding the offset y to $-\Delta E$, the offset y is subtracted from the comparison target product Tf−1(u) (corresponding to thermal excitation energy) of a temperature T and a random number. However, either the addition or subtraction is applicable.

The offset control circuit 82 performs a control operation such that the offset y at a local solution (a solution where the energy indicates a locally minimum value) is greater than that of a non-local solution. In the example in FIG. 11, the offset control circuit 82 includes an accumulator 82a having a reset terminal R. The accumulator 82a outputs 0 as the offset y when the transition determination result f inputted to the reset terminal R indicates acceptance of the state transition (namely, when the state transition occurs). The accumulator 82a also has an input terminal and a clock terminal. When the transition determination result f indicates that the state transition is not accepted (namely, when the state transition will not occur), each time the clock terminal is supplied with a pulse signal (not illustrated), the accumulator 82a adds an offset increment $\Delta y$ inputted to the input terminal to the offset y. For example, the pulse signal (not illustrated) is supplied by a state machine. The offset increment $\Delta y$ is stored in a register (not illustrated), for example.

When $-\Delta E+y$, which is the sum of the $-\Delta E$ outputted by selector 14b2 and the offset y stored in the accumulator 82a, is greater than the product $Tf^{-1}(u)$ of the temperature T and the random number, the transition control unit 80 as described above accepts the corresponding state transition.

In addition, the accumulator 82a changes the offset y as follows. If a state transition has been accepted and has occurred, the accumulator 82a resets the offset y to 0. If no state transition has been accepted and has occurred, the accumulator 82a increments the offset y by the offset increment $\Delta y$.

Figure 12:
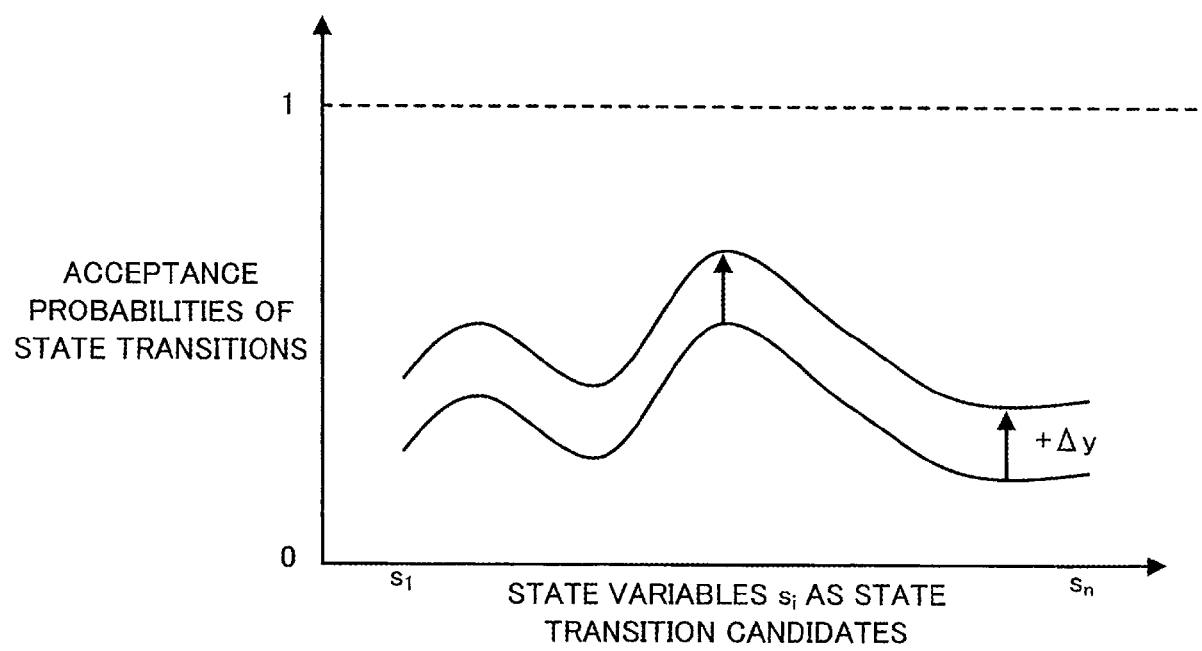
FIG. 12 illustrates a first example of change of a state transition acceptance probability when a transition control unit according to a comparative example is used.

FIG. 12 illustrates a first example of change of the probability of acceptance of an individual state transition when the transition control unit according to the comparative example is used. In FIG. 12, the horizontal axis represents state variables $s_i$ as candidates of state transitions, and the vertical axis represents the acceptance probability of the individual state transitions.

As illustrated in FIG. 12, when the offset increment $\Delta y$ is small, since the acceptance probability is slightly increased, escaping from a local solution could take much time.

Figure 13:
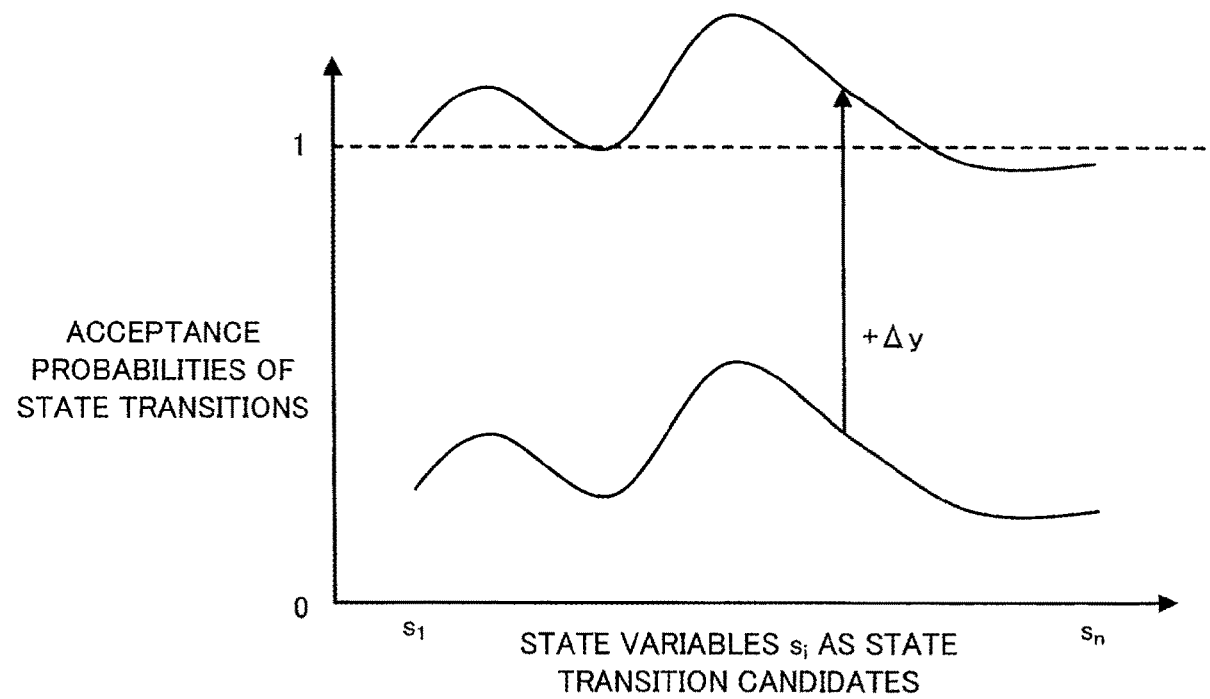
FIG. 13 illustrates a second example of change of the state transition acceptance probability when the transition control unit according to the comparative example is used.

FIG. 13 illustrates a second example of change of the probability of acceptance of an individual state transition when the transition control unit according to the comparative example is used. In FIG. 13, the horizontal axis represents state variables $s_i$ as candidates of state transitions, and the vertical axis represents the acceptance probabilities of the individual state transitions.

As illustrated in FIG. 13, when the offset increment $\Delta y$ is large, since the individual acceptance probability is significantly increased, state transitions occur excessively frequently. Thus, the solution could not converge into an optimal solution.

In contrast, in the case of the transition control units 20 and 40 illustrated in FIGS. 1 and 6, respectively, as M is brought closer to 1, the acceptance probability is increased, and escaping from a local solution is accelerated. In addition, since $0<M\leq 1$, even when M=1, the number of state transitions whose acceptance probability is 1 is small (1 in the example in FIG. 4). Thus, state transitions do not occur excessively frequently.

Figure 14:
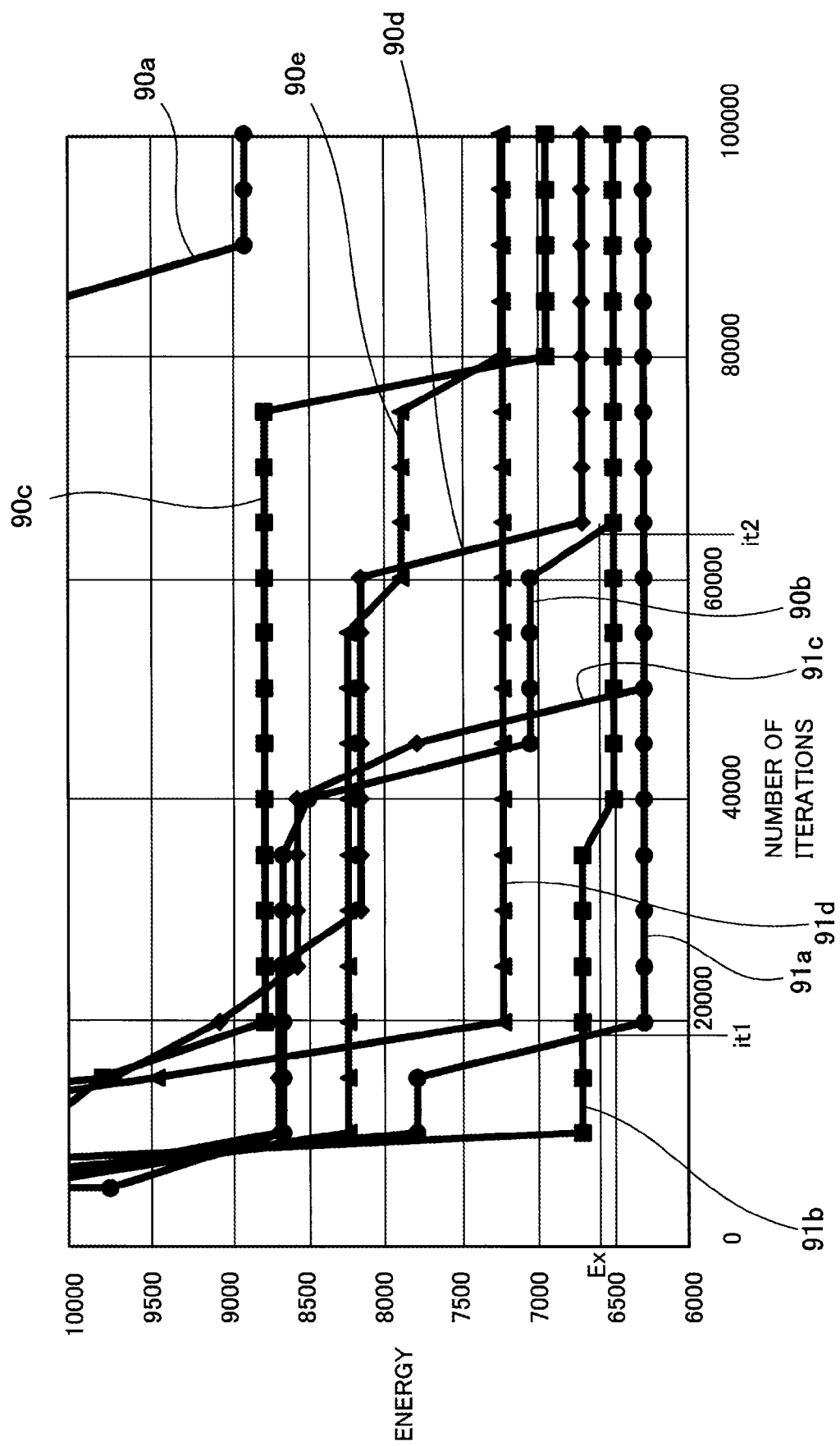
FIG. 14 illustrates examples of software simulation results based on simulated annealing performed by using the transition control units illustrated in FIGS. 6 and 11.

FIG. 14 illustrates examples of software simulation results based on simulated annealing performed by using the transition control units illustrated in FIGS. 6 and 11. The problem to be optimized is a traveling salesman problem formulated by an ising model (a Boltzmann machine). In FIG. 14, the horizontal axis represents the number of iterations (the number of repetitions of processing for updating the state and energy in simulated annealing), and the vertical axis represents the energy.

Results 90a to 90e indicate simulation results of change of the energy with respect to the number of iterations when the transition control unit 80 in FIG. 11 changes the offset increment $\Delta y$. The result 90a indicates a simulation result when the offset increment $\Delta y$ is 0 (namely, when no offset is not used). The results 90b to 90e indicate simulation results when the offset increments $\Delta y$ are 0.05, 0.1, 0.15, and 0.2, respectively.

In contrast, results 91a to 91d indicate simulation results of change of the energy with respect to the number of iterations when the transition control unit 40 in FIG. 6 changes M. The results 91a to 91d indicate simulation results when M=0.25, 0.5, 0.75, and 1, respectively.

When the minimum energy value (the energy at an optimal solution) is about 6,000, in the case of the transition control unit 80, the smallest number of iterations it2 to reach an energy Ex, which is larger than the minimum value by about 10%, is about 65,000, which is more than triple the smallest number of iterations it1 in the case of the transition control unit 40.

Namely, the example in FIG. 14 indicates that the transition control unit 40 calculates a value close to an optimal solution at least three times faster than the transition control unit 80.

The example in FIG. 14 indicates that use of the transition control unit 40 and M=0.25 achieve the lowest energy (about 6,300). In contrast, when the transition control unit 80 is used, the lowest energy is about 6,800. Thus, the transition control unit 40 achieves a solution closer to an optimal solution than the transition control unit 80.

The degree of the above effect differs depending on the optimization problem to be calculated. For example, the value of M is selected based on the individual optimization problem and the software simulation results as described above such that the calculation time is further shortened.

While an aspect of the optimization apparatuses and control methods thereof based on embodiments has been described, the above description is only an example. The embodiments are not limited to the above description.

In an aspect, the embodiments shorten the calculation time of an individual optimization problem.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus for solving an optimization problem by using simulated annealing, the optimization apparatus comprising:
   a state storage circuit configured to hold values of a plurality of state variables included in an evaluation function that represents energy;
   a calculation circuit configured to calculate each amount of change in energy for a plurality of state transitions that occur in response to change of the values of the plurality of state variables respectively, and configured to output the each amount of change in energy;
   a transition controller configured to receive the each amount of change in energy, determine a minimum value among the each amount of change in energy for the plurality of state transitions, calculate first values by subtracting an offset from the each amount of change in energy, and when the minimum value is positive, stochastically determine based on a temperature, the first values, and a random number whether to accept any of the plurality of state transitions and when the minimum value is 0 or less, stochastically determine based on the temperature, the each amount of change in energy, and the random number whether to accept any of the plurality of state transitions, the offset being obtained by multiplying the minimum value by a second value that is greater than 0 and less than or equal to 1; and a temperature controller configured to gradually drop the temperature used by the transition controller, the transition controller causes the state storage circuit to update any of the values of the plurality of state variables based on a state transition among the plurality of state transitions when the state transition is accepted.

2. The optimization apparatus according to claim 1, wherein the transition controller controls the offset such that an acceptance probability of a state transition corresponding to the minimum value indicates 1.

3. The optimization apparatus according to claim 1, wherein the transition controller includes:

a minimum value detection circuit configured to detect the minimum value;

a first arithmetic circuit configured to calculate the offset;

a second arithmetic circuit configured to calculate the first values by subtracting the offset from the each amount of change in energy corresponding to the plurality of state transitions;

a first selector configured to output, based on a selection signal, the each amount of change in energy or the first values calculated by the second arithmetic circuit; and a selection signal generation circuit configured to generate the selection signal, which causes the first selector to select the each amount of change in energy when the minimum value is 0 or less and to select the first values calculated by the second arithmetic circuit when the minimum value is a positive value.

4. The optimization apparatus according to claim 3, wherein the transition controller further includes:

a second selector configured to select, based on the random number, a first output value about a first state transition from output values of the first selector about the plurality of state transitions;

a storage circuit configured to output a value of an inverse function of a function that represents acceptance probabilities of the plurality of state transitions, each of the acceptance probabilities being represented by a Metropolis method or a Gibbs method based on the random number;

a multiplier configured to output the thermal excitation energy represented by a product of the value of the inverse function and the temperature; and a comparator configured to output a determination result indicating whether to accept the first state transition, the determination result being represented by a value corresponding to a comparison result between the first output value selected by the second selector and the thermal excitation energy.

5. The optimization apparatus according to claim 3, wherein the transition controller further includes:

a storage circuit configured to output a value of an inverse function of a function that represents acceptance probabilities of the plurality of state transitions, each of the acceptance probabilities being represented by a Metropolis method or a Gibbs method based on the random number;

a multiplier configured to output the thermal excitation energy represented by a product of the value of the inverse function and the temperature;

a comparator configured to output determination results respectively indicating whether to accept the plurality of state transitions, each of the determination results being represented by a value corresponding to a comparison result between an output value of the first selector about a corresponding one of the plurality of state transitions and the thermal excitation energy; and a transition number determination circuit configured to preferentially select a first state transition accepted among the plurality of state transitions based on the determination results and the random number and output a number of the first state transition and a determination result corresponding to the first state transition.

6. A control method of an optimization apparatus for solving an optimization problem by using simulated annealing, the control method comprising:

holding, by a state storage circuit of the optimization apparatus, values of a plurality of state variables included in an evaluation function that represents energy;

calculating, by a calculation circuit of the optimization apparatus, each amount of change in energy for each of a plurality of state transitions that occur in response to change of the values of the plurality of state variables respectively, outputting, by the calculation circuit, the each amount of change in energy;

receiving, by a transition controller of the optimization apparatus, the each amount of change in energy, determining, by the transition controller, a minimum value among the each amount of change in energy for the plurality of state transitions, calculating, by the transition controller, first values by subtracting an offset from the each amount of change in energy, and when the minimum value is positive, stochastically determining, by the transition controller, based on a temperature, the first values, and a random number whether to accept any of the plurality of state transitions and when the minimum value is 0 or less, stochastically determining, by the transition controller, based on the temperature, the each amount of change in energy, and the random number whether to accept any of the plurality of state transitions, the offset being obtained by multiplying the minimum value by a second value that is greater than 0 and less than or equal to 1; and gradually dropping, by a temperature controller of the optimization apparatus, the temperature used by the transition controller, the transition controller causes the state storage circuit to update any of the values of the plurality of state variables based on a state transition among the plurality of state transitions when the state transition is accepted.

* * * * *